G. Cowing,
Polishing Cylinders.
No. 2,282. Reissued June 12, 1866.
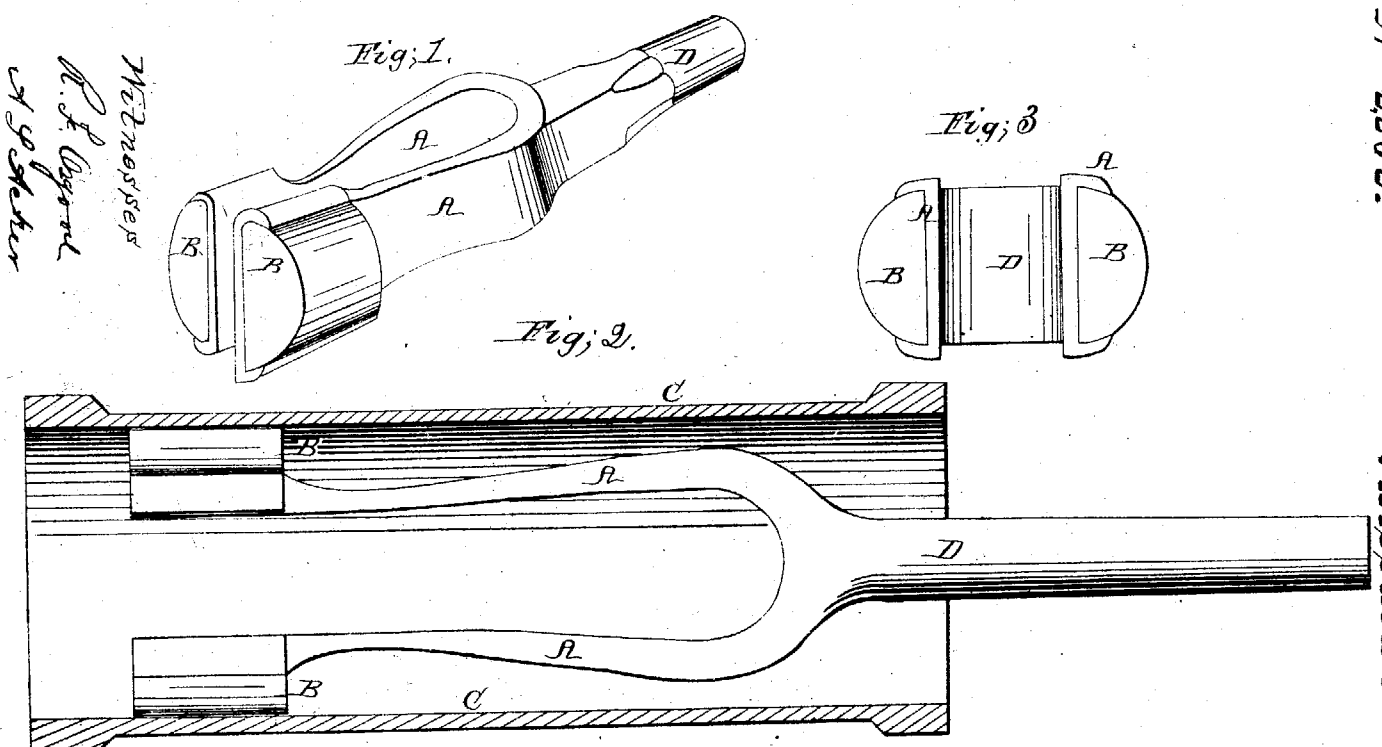
Witnesses
R. F. Osgood
A. S. Acker
Inventor;
George Cowing
By J. Fraser & Co
Attys

UNITED STATES PATENT OFFICE.

GEORGE COWING, OF SENECA FALLS, NEW YORK.

IMPROVED CYLINDER-POLISHER.

Specification forming part of Letters Patent No. 38,153, dated April 14, 1863; Reissue No. 2,282, dated June 12, 1866.

*To all whom it may concern:*

Be it known that I, GEORGE COWING, of Seneca Falls, in the county of Seneca and State of New York, did invent a new and useful Device for Polishing the Interior of Hollow Cylinders, such as Pump-Cylinders, &c., for which Letters Patent were granted me April 14, 1863; and I do hereby declare that the following is a full and exact description thereof, reference being had to the accompanying drawings, making part of this specification.

Figure 1 is a perspective view of my improved polishing device; Fig. 2, a longitudinal section of a pump-cylinder with the polishing device situated within the same in the act of polishing; Fig. 3, an end view of the polishing device.

Like letters of reference indicate corresponding parts in all the figures.

It is frequently desirable to polish or smooth the interior surface of hollow cylinders, especially when the same are cast, as is the case with pump-cylinders. In order that the piston shall fit tightly and work easily, the interior surface must be very true and smooth.

My invention consists in the employment of suitable rubbers or polishers held out against the interior surface of the cylinder by means of expanding arms to which they are secured, these arms being connected with a shank, so that a rotary or longitudinal motion may be given, as may be desired.

The rubbers or polishers B B may be made of any suitable material that will serve the desired purpose. I prefer, however, the material known as "emery vulcanite"—a compound of emery and vulcanized india-rubber. Any desired number of rubbers may be employed; but two will generally be found sufficient for all practical purposes. These rubbers are secured in any convenient manner to the ends of arms A A, which are made to expand, or press outward, so that the rubbers will bear against the sides of the cylinder with the requisite force.

I prefer a spring action to produce the expansion, and, as represented, the arms themselves are made in the form of springs.

The arms A A are connected in any desirable manner with a shank, D, which may receive either a rotary or longitudinal motion, or a combination of the two motions, by being connected with any suitable power; or, if desirable, the polishing device may be held stationary while the cylinder C itself receives the motion.

The most convenient connection with the shank D is to make the said arms forked continuations of the shank itself, the parts combining as a whole.

In order to introduce the rubbers into the cylinder the arms A A are compressed. When once introduced the arms are allowed to expand so as to press the rubbers against the sides of the cylinder, and the proper motion is communicated to the polishing device or to the cylinder.

The advantages of this device are manifest. The labor of polishing or smoothing the interior of cylinders is accomplished automatically, and with great rapidity and exactness, and with much greater expedition than by the usual laborious process by hand.

I do not claim, simply, expanding arms branching from a single stem, as I am aware that such a device has before been employed for cleaning lamp-chimneys; but

I claim as my invention and desire to secure by Letters Patent—

The expanding arms A A, in combination with the vulcanized scourers B B, substantially as described.

GEORGE COWING.

Witnesses:

PHILO COWING,

CYRUS J. THOMAS.